United States Patent
Inoue et al.

(10) Patent No.: US 6,720,404 B2
(45) Date of Patent: Apr. 13, 2004

(54) POLYCARBONATES FOR OPTICAL USE, AND THEIR APPLICATIONS

(75) Inventors: Kazushige Inoue, Moka (JP); Tomoaki Shimoda, Ichihara (JP)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/116,843

(22) Filed: Apr. 5, 2002

(65) Prior Publication Data

US 2003/0009002 A1 Jan. 9, 2003

(30) Foreign Application Priority Data

May 28, 2001 (JP) ........................................ 2001-159442

(51) Int. Cl.$^7$ .............................................. C08G 64/02
(52) U.S. Cl. .................. 528/196; 428/64; 528/198; 528/219; 528/193; 528/200; 528/501
(58) Field of Search ............................ 428/64; 528/196, 528/198, 219, 193, 200, 501

(56) References Cited

U.S. PATENT DOCUMENTS

| | | |
|---|---|---|
| 4,371,660 A | 2/1983 | Calundann et al. |
| 4,526,929 A | 7/1985 | Weber et al. |
| 5,026,817 A | 6/1991 | Sakashita et al. |
| 5,097,002 A | 3/1992 | Sakashita et al. |
| 5,142,018 A | 8/1992 | Sakashita et al. |
| 5,151,491 A | 9/1992 | Sakashita et al. |
| 5,187,242 A | 2/1993 | Sakashita et al. |
| 5,319,066 A | 6/1994 | King, Jr. |
| 5,340,905 A | 8/1994 | Kühling et al. |
| 5,364,926 A | 11/1994 | Sakashita et al. |
| 5,399,659 A | 3/1995 | Kühling et al. |
| 5,418,316 A | 5/1995 | Kühling et al. |
| 5,502,153 A | 3/1996 | Sakashita et al. |
| 5,606,007 A | 2/1997 | Sakashita et al. |
| 5,652,313 A | 7/1997 | Kühling et al. |
| 5,767,224 A | 6/1998 | Kühling et al. |
| 5,859,172 A * | 1/1999 | Sakashita et al. ........... 528/219 |
| 5,942,594 A | 8/1999 | Nakae et al. |
| 6,022,943 A | 2/2000 | Inoue et al. |
| 6,262,218 B1 | 7/2001 | Inoue et al. |
| 6,303,735 B1 | 10/2001 | Shimoda et al. |

FOREIGN PATENT DOCUMENTS

| | | |
|---|---|---|
| EP | 0 615 996 A1 | 9/1994 |
| JP | 10158499 | 6/1998 |
| JP | 11035671 | 2/1999 |
| JP | 11300842 | 11/1999 |
| WO | WO 00/59984 | 10/2000 |

* cited by examiner

Primary Examiner—Terressa M. Boykin

(57) ABSTRACT

This specification discloses polycarbonates for optical use. These polycarbonates are prepared by reacting a bisphenol and carbonic diester in the presence of an alkaline compound catalyst. These polycarbonates have:

(i) an intrinsic viscosity (IV) as determined at 20° C. in methylene chloride of between 0.34 and 0.38;

(ii) a glass transition temperature (Tg) as determined by DSC of between 143 and 147° C.; and (iii) an intrinsic viscosity (IV) and glass transition temperature (Tg) ratio complying with the following general formula (A):

$$IV \times 95.888 + 107.9 < Tg < IV \times 95.888 + 113.7 \qquad (A)$$

10 Claims, 1 Drawing Sheet

POLYCARBONATES FOR OPTICAL USE, AND THEIR APPLICATIONS

The present application is a U.S. non-provisional application based upon and claiming priority from Japanese Application No. 2001-159442, with a filing date of May 28, 2001, which is hereby incorporated by reference.

DETAILED DESCRIPTION OF THE INVENTION

Technical Field of the Invention

The present invention relates to polycarbonates for optical use, and in particular to polycarbonates for optical use which have better color stability and formability, making them especially suitable for optical disk substrates.

Technical Background of the Invention

Polycarbonates have exceptional mechanical properties such as impact resistance, as well as other properties such as heat resistance and transparency, and are thus widely used in applications such as various mechanical parts, optical disks, and automobile parts. They are particularly promising for optical applications such as optical disks for memory, fiber optics, and lenses, and are the subject of considerable research.

Methods known for the production of such polycarbonates include directly bringing about a reaction between a phosgene and a bisphenol such as bisphenol A (interfacial method), or bringing about the melt polycondensation of a bisphenol such as bisphenol A and a carbonic diester such as diphenyl carbonate (transesterification).

A drawback of the interfacial method, which features the use of phosgenes and also employs large amounts of solvent such as methylene chloride, is the extreme difficulty involved in getting rid of the chlorine, which makes this not an altogether desirable option when producing polycarbonates for optical use.

An advantage of melt polycondensation, on the other hand, is that polycarbonates can be produced at a lower cost compared to the interfacial method. In addition, no toxic substances such as phosgenes are used, and there is no need for solvents such as methylene chloride, making this an extremely attractive way to produce polycarbonates for optical use.

However, the molecular weight must be adjusted to a low level within a narrow range in order to ensure that polycarbonates used as optical materials will result in a disk having a certain level of strength and to allow the transfer of fine pits and grooves on the surface during injection molding.

However, as noted in Japanese Unexamined Patent Publication (Kokai) 11-300842, even with the use of such low molecular weight polycarbonates, the material must be formed under extremely limited conditions in which the difference between the glass transition temperature of the polycarbonate resin and the temperature to which the mold is set on the stamper side is between 0 and 7° C., which can be a drawback in terms of mass production.

The addition of 3.5 to 8 wt % of low molecular weight material represented by the following formula for polycarbonates for optical use has been proposed in Japanese Unexamined Patent Publication (Kokai) 11-35671 in an effort to improve the transfer properties during injection molding, and the copolymerization of a polysiloxane compound or the like with polycarbonates has also been proposed, as disclosed in Japanese Unexamined Patent Publication (Kokai) 10-158499.

Chemical Formula 1

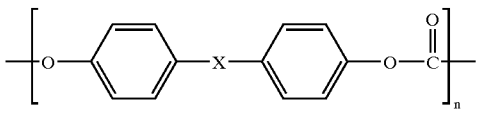

(where X is a $C_1$ to $C_4$ alkylene, $C_2$ to $C_3$ alkylidene, oxygen atom, sulfur atom, carbonyl, sulfinyl, or sulfone, and n is an integer of 1 to 4).

However, problems encountered when blending such low molecular weight polycarbonates are the considerable production of gas during molding, and the extensive mold staining during continuous production, resulting in unsatisfactory productivity. In addition, products obtained through the copolymerization of polysiloxane compounds require a considerable investment in the manufacture of the polycarbonates, while equipment which is different from conventional optical disk manufacturing equipment is also required due to differences in the optical properties and formability of the copolymer polycarbonates that are obtained.

As a result of extensive research in view of the foregoing, the inventors perfected the present invention upon discovering that better formability and color stability as well as better transfer properties could be obtained during the injection molding of optical disks by using polycarbonates obtained through melt polycondensation, where such polycarboxylates for optical use comprise a bisphenol and carbonic diester which have undergone melt polycondensation in the presence of an alkaline compound catalyst, said polycarbonates for optical use wherein in that:

(i) the intrinsic viscosity (IV) as determined at 20° C. in methylene chloride is between 0.34 and 0.38;

(ii) the glass transition temperature (Tg) as determined by DSC is between 143 and 147° C.; and (iii) the intrinsic viscosity (IV) and glass transition temperature (Tg) comply with the following formula (A):

$$IV \times 95.888 + 107.9 < Tg < IV \times 95.888 + 113.7 \quad (A)$$

OBJECT OF THE INVENTION

In view of the conventional technology described above, an object of the present invention is to provide polycarbonates for optical use with better formability and color stability at elevated temperatures, as well as applications thereof.

SUMMARY OF THE INVENTION

The polycarbonates for optical use (resin compositions) of the present invention are polycarbonates obtained upon melt polycondensation of a bisphenol and a carbonic diester in the presence of an alkaline compound catalyst, where the polycarbonates have the properties defined in (i) through (iii) above.

The aforementioned bisphenols should substantially comprise bisphenol A.

The polycarbonates for optical use should comprise no more than 1.5 wt % fractions with a molecular weight of 1,000 or less, as determined by GPC.

Optical disk substrates of the present invention are formed of the aforementioned polycarbonates for optical use.

DETAILED DESCRIPTION OF THE INVENTION

Figure 1:
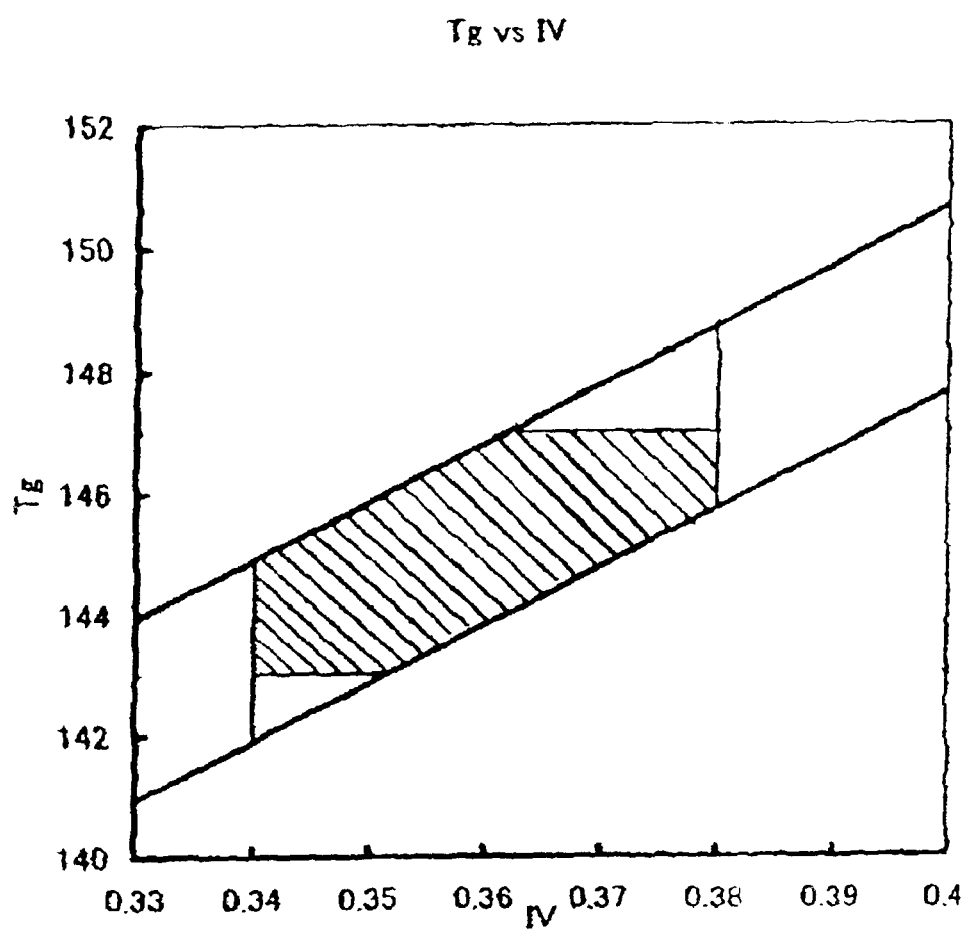
FIG. 1 summarizes the relationship between Tg and IV in the polycarbonates for optical use in the present invention.

The polycarbonates for optical use in the present invention are detailed below.

Polycarbonates for Optical Use

The polycarbonate resins for optical use in the present invention are obtained through melt polycondensation of a bisphenol and a carbonic diester in the presence of an alkaline compound catalyst.

In the polycarbonates for optical use in the present invention, the (i) intrinsic viscosity (IV) is between 0.34 and 0.38, and preferably between 0.345 and 0.375. The intrinsic viscosity is determined at 20° C. in methylene chloride solvent using an Ostwald viscometer.

Polycarbonates for optical use with such an intrinsic viscosity have low optical distortion and good strength. An intrinsic viscosity lower than 0.34 will sometimes cause a precipitous loss of strength. An intrinsic viscosity over 0.38 can sometimes result in poor fluidity during molding and in poor transfer of fine pits and grooves on the surface when the optical disk is injection molded.

In the polycarbonates for optical use in the present invention, the (ii) glass transition temperature is between 143 and 147° C. Although a glass transition temperature below 143° C. will result in good transfer, the substrate can warp, resulting in poor flatness, while a temperature over 147° C. will not permit satisfactory transfer and can compromise the properties of the disk. The glass transition temperature of the disk is determined with a differential thermal analyzer.

The Tg of the polycarbonates of the present invention is lower relative to the intrinsic viscosity than in conventional polycarbonates, which can be attributed to the way the polycarbonates of the present invention are produced.

In the polycarbonates of the present invention, the (iii) intrinsic viscosity (IV) and glass transition temperature (Tg) comply with the following formula [A]:

$$IV \times 95.888 + 109.3 < Tg < IV \times 95.888 + 112.3 \quad [A]$$

Even more preferably, they should comply with the following formula [A']:

$$IV \times 95.888 + 107.9 < Tg < IV \times 95.888 + 113.7 \quad [A']$$

Polycarbonates for optical use complying with this relational expression will have better formability and color stability, and will permit more precise and uniform transfer of fine pits and grooves on the surface when the optical disk is injection molded, resulting in a non-warping disk with better flatness.

FIG. 1 shows the relationship between Tg and IV in the polycarbonates for optical use in the present invention.

The polycarbonates for optical use in the present invention should comprise no more than 1.5 wt % of fractions with a molecular weight of 1,000 or less, as determined by GPC. An abundance of low molecular weight components will result in a lower Tg or higher fluidity, which can provide better transfer properties but can cause molds to become stained, thereby compromising productivity and the moisture resistance of the disks.

The polycarbonates for optical use in the present invention as described above can be produced through the melt polycondensation of a bisphenol and carbonic diester in the presence of an alkaline compound catalyst.

Melt Polycondensation of Polycarbonates

Compounds represented by formula [I] below can be used as the bisphenol starting material during the melt polycondensation of polycarbonates.

Chemical Formula 2

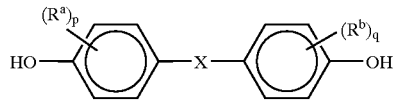

where $R^a$ and $R^b$ are each independently a halogen atom or monovalent hydrocarbon group; p and q are integers of 0 to 4;

X is

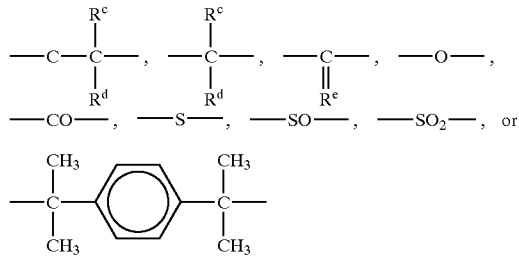

and $R^c$ and $R^d$ are hydrogen or monovalent hydrocarbons, where $R^c$ and $R^d$ may form a cyclic structure, $R^e$ being a divalent hydrocarbon group).

Specific examples of bisphenols represented by formula [I] above include 1,1-bis(4-hydroxyphenyl)methane, 1,1-bis(4-hydroxyphenyl)ethane, 2,2-bis(4-hydroxyphenyl) propane (referred to below as bisphenol A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, bis(4-hydroxyphenyl) phenylmethane, 2,2-bis(4-hydroxy-1-methylphenyl) propane, 1,1-bis(4-hydroxy-t-butylphenyl)propane, 2,2-bis (4-hydroxy-3-bromophenyl)propane and similar bis (hydroxyaryl)alkanes, as well as bis(hydroxyaryl) cycloalkanes such as 1,1-bis(4-hydroxyphenyl) cyclopentane and 1,1-bis(4-hydroxyphenyl)cyclohexane.

Examples of bisphenols in which X in the aforementioned formula is —O—, —X—, —SO—, or —$SO_2$— in the present invention include bis(hydroxyaryl)ethers such as 4,4'-dihyroxydiphenyl ether and 4,4'-dihydroxy-3,3'-dimethylphenyl ether, bis(hydroxydiaryl) sulfides such as 4,4'-dihydroxydiphenyl sulfide and 4,4'-dihyroxy-3,3'-dimethyldiphenyl sulfide, bis(hydroxydiaryl) sulfoxides such as 4,4'-dihydroxydiphenyl sulfoxide and 4,4'-dihyroxy-3,3'-dimethyldiphenyl sulfoxide, and bis(hydroxydiaryl) sulfones such as 4,4'-dihydroxydiphenyl sulfone and 4,4'-dihyroxy-3,3'-dimethyldiphenyl sulfone.

Compounds represented by formula [II] below can also be used as bisphenols.

Chemical Formula 3

(where $R^f$ represents a halogen atom or $C_1$ to $C_{10}$ hydrocarbon group or halogen-substituted hydrocarbon group, and n is an integer of 0 to 4; when n is 2 or more, $R^f$ may be the same or different).

Specific examples of bisphenols represented by formula [II] include resorcin, substituted resorcins such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafluororesrocin, 2,3,4,6-tetrabromoresorcin; catechols; and hydroquinone and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluroohydroquinone, and 2,3,5,6-tetrabromohydroquinone.

2,2,2',2'-tetrahydro-3,3,3',3'-tetramethyl-1,1'-spirobi-[IH-indene]-6,6'-diols represented by the following formula can also be used as bisphenols.

Chemical Formula 4

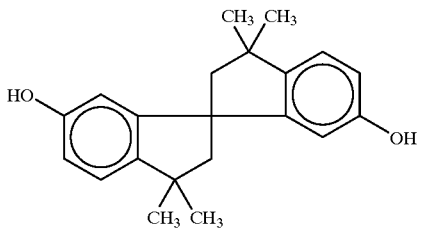

Of the above examples, bisphenols represented by formula [I] are preferred. Bisphenols substantially comprising bisphenol A are especially preferred in the polycarbonates for optical use in the present invention.

Specific examples of carbonic diesters include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate. These can also be used in combinations of two or more. The use of diphenyl carbonate is particularly preferred.

Such carbonic diesters may include dicarboxylic acids and dicarboxylic esters. Specifically, the carbonic diester will preferably include no more than 50 mol %, and even more preferably no more than 30 mol %, dicarboxylic acid or dicarboxylic diester.

Examples of such dicarboxylic acids or dicarboxylic esters include aromatic dicarboxylic acids such as terephthalic acid, isophthalic acid, diphenyl terephthalate, and diphenyl isophthalate; aliphatic dicarboxylic acids such as succinic acid, glutaric acid, adipic acid, pimelic acid, suberic acid, azelaic acid, sebacic acid, decanedioic acid, dodecanedioic acid, diphenyl sebacate, diphenyl decanedioate, and diphenyl dodecanedioate; and alicyclic dicarboxylic acids such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate, and diphenyl 1,4-cyclohexanedicarboxylate. The carbonic diester may include two or more of such dicarboxylic acids or dicarboxylic esters.

In the present invention, the bisphenols and carbonic diesters can be filtered in advance while molten.

The aforementioned bisphenols and carbonic diesters are normally mixed in a proportion of 1.00 to 1.30 mol, and preferably 1.01 to 1.20 mol carbonic diester per mol bisphenol.

An alkaline compound catalyst is used as the melt polycondensation catalyst during the melt polycondensation of the carbonic diester and bisphenol. [A] Alkali metal compounds and/or alkaline earth metal compounds (referred to below as [A] alkali(ne earth) metal compounds) are usually used as the alkaline compound catalyst.

Desirable examples of [A] alkali(ne earth) metal compounds include organic acid salts, inorganic acid salts, oxides, hydroxides, hydrides, or alcoholates of alkali metals and alkaline earth metals.

Specific examples of alkali metal compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium state, lithium stearate, sodium borohydride, lithium borohydride, sodium borophenylide, sodium benzoate, potassium benzoate, lithium benzoate, disodium hydrogenphosphate, dipotassium hydrogenphosphate, dilithium hydrogenphosphate, as well as disodium salts, dipotassium salts, and dilithium salt of bisphenol A, and sodium salts, potassium salts, and lithium salts of phenol. Specific examples of alkaline earth compounds include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. These compounds can be used in combinations of two or more.

During the melt polycondensation, such alkali(ne earth) metal compounds should be used in a proportion of $1 \times 10^{-8}$ to $1 \times 10^{-3}$ mol, preferably $1 \times 10^{-7}$ to $2 \times 10^{-6}$ mol, and even more preferably $1 \times 10^{-7}$ to $8 \times 10^{-7}$ mol, per mol bisphenol. When the bisphenol starting material for the melt polycondensation already includes alkali(ne earth) metal compounds, the amount that is added should be controlled to ensure that the content of alkali(ne earth) metal compounds present during the polycondensation reaction is within the aforementioned range per mol bisphenol.

[B] basic compounds can be used as the melt polycondensation catalyst with the aforementioned [A] alkali(ne earth) metal compounds. Examples of such [B] basic compounds include nitrogenous basic compounds that readily decompose or are volatile at elevated temperatures, specific examples of which include the following.

Ammonium hydroxides containing alkyl, aryl, and aralkyl groups such as tetramethyl ammonium hydroxide ($Me_4NOH$), tetraethyl ammonium hydroxide ($Et_4NOH$), tetrabutyl ammonium hydroxide ($Bu_4NOH$), and trimethylbenzyl ammonium hydroxide;

tertiary amines such as trimethylamine, triethylamine, dimethylbenzylamine, and triphenylamine;

secondary amines represented by $R_2NH$ (where R is an alkyl such as methyl or ethyl, or an aryl such as phenyl or toluyl);

primary amines represented by $RNH_2$ (where R is the same as above);

pyridines such as 4-dimethylaminopyridine, 4-diethylaminopyridine, and 4-pyrrolidinopyridine;

imidazoles such as 2-methylimidazole and 2-phenylimidazole; and basic salts such as ammonia, tetramethyl ammonium borohydride (Me$_4$NBH$_4$), tetrabutyl ammonium borohydride (Bu$_4$NBH$_4$), tetrabutyl ammonium tetraphenylborate (Bu$_4$NBPh$_4$), and tetramethyl ammonium tetraphenylborate (Me$_4$NBPh$_4$).

Of these, the use of tetraalkyl ammonium hydroxides is preferred.

The above [B] nitrogenous basic compounds can be used in a proportion of $1\times10^{-6}$ to $1\times10^{-1}$ mol, and preferably $1\times10^{-5}$ to $1\times10^{-2}$ mol, per mol bisphenol.

[C] boric acid compounds can also be used as the catalyst.

Examples of such [C] boric acid catalysts include boric acid and boric esters.

Boric esters include those represented by the following general formula.

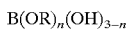
$$B(OR)_n(OH)_{3-n}$$

(where R is an alkyl such as methyl or ethyl, or an aryl such as phenyl, and n is 1,2 or 3).

Specific examples of such boric esters include trimethyl borate, triethyl borate, tributyl borate, trihexyl borate, triheptyl borate, triphenyl borate, tritolyl borate, and trinaphthyl borate.

Such [C] boric acid compounds can be used in a proportion of $1\times10^{-8}$ to $1\times10^{-1}$ mol, preferably $1\times10^{-7}$ to $1\times10^{-2}$ mol, and even more preferably $1\times10^{-6}$ to $1\times10^{-4}$ mol, per mol bisphenol.

The melt polycondensation catalyst used in the present invention is preferably a combination of [A] alkali(ne earth) metal compounds and [B] nitrogenous basic compounds, or a three-way combination of [A] alkali(ne earth) metal compounds, [B] nitrogenous basic compounds, and [C] boric acid or boric esters.

Such a combination of [A] alkali(ne earth) metal compounds and [B] nitrogenous basic compounds is preferably used as the catalyst to ensure that the polycondensation progresses at a satisfactory rate and that a high-molecular weight polycarbonate is produced with high polymerization activity.

When a combination of [A] alkali(ne earth) metal compounds and [B] nitrogenous basic compounds is used or a combination of [A] alkali(ne earth) metal compounds, [B] nitrogenous basic compounds, and [C] boric acid or boric esters is used, the catalyst ingredients may be added in the form of a mixture to the molten mixture of bisphenols and carbonic diesters, or they may be separately added to such a molten mixture of bisphenols and carbonic diesters.

The melt polycondensation of the above bisphenols and carbonic diesters is brought about in the presence of the aforementioned melt polycondensation catalyst.

The melt polycondensation of the above bisphenols and carbonic diesters can be managed under the same conditions prevailing in conventional polycondensation. The reaction can be carried out in two stages, for example.

Specifically, in the first stage of the reaction, the bisphenol and carbonic diester are allowed to react at a temperature of 80 to 250° C., preferably 100 to 230° C., and even more preferably 120 to 190° C., for 0.01 to 5 hours, preferably 0.01 to 4 hours, and even more preferably 0.01 to 3 hours, at ambient pressure. As the pressure of the reaction system is then reduced, the reaction temperature is increased during the reaction between the bisphenol and carbonic diester, and polycondensation between the bisphenol and carbonic diester is carried out at a final pressure no higher than 5 mmHg, and preferably no higher than 1 mmHg, and a temperature between 240 and 320° C. The reaction conditions are adjusted to result in the specified intrinsic viscosity, Tg, and amount of low molecular weight components. Specifically, after the desired intrinsic viscosity has been reached, the low molecular weight components such as unreacted material are separated as the catalytic activity and pressure are reduced.

The aforementioned polycondensation may be run in continuous or batch mode. Reaction equipment in the form of tanks, tubes, or towers may be used during the aforementioned reaction.

Multifunctional compounds with 3 or more functional groups per molecule can be used along with the aforementioned bisphenols and carbonic diesters during the production of polycarbonates in the present invention. Such multifunctional compounds should have phenolic hydroxyl groups or carboxyl groups, while compounds with 3 phenolic hydroxyl groups are especially desirable. Examples of such multifunctional compounds include 1,1,1-tris(4-hydroxyphenyl)ethane, 2,2',2"-tris(4-hydroxyphenyl)diisopropylbenzene, α-methyl-α,α',α'-tris(4-hydroxyphenyl)-1,4-diethylbenzene, α,α',α"-tris(4-hydroxyphenyl)-1,3,5-triisopropylbenzene, fluoroglycine, 4,6-dimethyl-2,4,6-tri(4-hydroxyphenyl)-heptane-2,1,3,5-tri (4-hydroxyphenyl)benzene, 2,2-bis-[4,4-(4,4'-dihydroxyphenyl)-cyclohexyl]-propane, trimellitic acid, 1,3,5-benzenetricarboxylic acid, and pyromellitic acid.

1,1,1-tris(4-hydroxyphenyl)ethane and α,α',α"-tris(4-hydroxyphenyl)-1,3,5-triisopropylbenzene are preferred among the above.

Such multifunctional compounds can usually be used in a proportion of 0.03 mol or less, preferably between 0.001 and 0.02 mol, and even more preferably between 0.001 and 0.01 mol per mol bisphenol.

A terminal hydroxyl concentration of between 2 and 30 mol % is preferred for the terminals of the polycarbonate molecules in the composition of the present invention.

Depending on the intended application, a variety of additives can be blended in the polycarbonates for optical use in the present invention.

Additives

Examples of such additives include (b) phosphorous acid, (c) sulfurous compounds, or their derivatives, with a pKa of no more than 3, and (d) alcohol compounds containing ester groups.

The (b) phosphorous acid can be in the form of salts such as sodium or potassium salts. The (b) phosphorous acid should be used in an amount of 0.1 to 10 ppm, and preferably 0.2 to 5 ppm, relative to the polycarbonate for optical use. The use of (b) phosphorous acid in such amounts can prevent a variety of problems caused by heavy metal ions contaminating the polycarbonates.

Examples of (c) acidic sulfur-containing compounds and derivatives (referred below to as acidic compounds (c)) with a pKa of no more than 3 include sulfurous acid, sulfuric acid, sulfinic acid compounds, sulfonic acid compounds and derivatives thereof. Examples of sulfurous acid derivatives include dimethyl sulfurous acid, diethyl sulfurous acid, dipropyl sulfurous acid, dibutyl sulfurous acid, and diphenyl sulfurous acid.

Examples of sulfuric acid derivatives include dimethyl sulfuric acid, diethyl sulfuric acid, dipropyl sulfuric acid, dibutyl sulfuric acid, and diphenyl sulfuric acid. Examples of sulfinic acid compounds include benzenesulfinic acid, toluenesulfinic acid, and naphthalenesulfinic acid.

Examples of sulfonic acid compounds and derivatives thereof include compounds of General Formula V below and their ammonium salts or phosphonium salts.

Chemical Formula 5

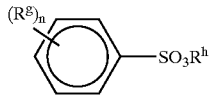

[V]

(where $R^g$ is a $C_1$ to $C_{50}$ hydrocarbon group or halogen-substituted hydrocarbon group, $R^h$ is a hydrogen atom or $C_1$ to $C_{50}$ hydrocarbon group or halogen-substituted hydrocarbon group, and n is an integer of 0 to 3).

Such acidic compounds (c) should be used in an amount of between 0.5 and 100 ppm, and preferably between 1 and 50 ppm, relative to the polycarbonate. The use of acidic compounds (c) in these amounts can control discoloration of the polycarbonates caused by heat during molding.

The (c) acidic compounds may be added in advance during the final stages of melt polycondensation, and they may be added again as additives after having been already added during the final stages of polycondensation.

The prior addition of the acidic compounds during the final stages of melt polycondensation can neutralize or diminish the catalyst alkaline compound catalyst left over in the polycarbonates, thereby stopping the melt polycondensation in itself, while also enhancing the residence stability and water resistance.

Alcohol compounds containing ester groups are partial esters derived from polyhydric alcohols and monovalent fatty acids with 10 to 22 carbons. Examples include partial esters derived from polyhydric alcohols such as ethylene glycol, glycerin, and pentaerythritol and monovalent fatty acids with 10 to 22 carbons such as myristic acid, palmitic acid, stearic acid, oleic acid, behenic acid, and sulfated fish oil. The esterification should be 10 to 80%, and preferably 20 to 60%, where 100% is when the polyhydric alcohol is fully esterified. Such (d) alcohol compounds containing ester groups may be completely condensed or partially condensed. The (d) alcohol compound containing ester groups should be added in an amount of 50 to 1000 ppm, and preferably 100 to 800 ppm, relative to the [A] polycarbonate. The (d) alcohol compounds containing ester groups functions as release agents for the polycarbonates. The presence of such alcohol compounds with ester groups improves the release properties of molded products during molding, and thus improves productivity. Less than 50 ppm (d) alcohol compound with ester groups will result in lower release properties during melt forming, and can result in a product with optical distortion due to fogging or warpage when released. More than 1000 ppm can cause thermal decomposition during melt molding, which can result in a molded article with silver streaking and can stain the substrate or stamper.

A specific amount of (e) water may also be used as an additive. The water (e) should be added in an amount of 5 to 3000 ppm, and preferably 50 to 1000 ppm, relative to the polycarbonate. Thus adding the specified amount of water (e) will control yellowing by reducing the content of volatile impurities in the polycarbonate resin.

At least one compound selected from (f) phosphite esters or trimethyl phosphate may be added as an additive. Such a component (f) should be added in an amount of 10 to 1000 ppm, and preferably 10 to 500 ppm, relative to the polycarbonate.

Examples of phosphite ester include the compounds represented by the following general formula.

$$P(OR)_3$$

(where R is an alicyclic hydrocarbon group, aliphatic hydrocarbon group, or aromatic hydrocarbon, which may be the same or different).

Examples of such compounds include trialkyl phosphates such as trimethyl phosphite, triethyl phosphite, tributyl phosphite, trioctyl phosphite, tris(2-ethylhexyl)phosphite, trinonyl phosphite, tridecyl phosphite, trioctadecyl phosphite, tristearyl phosphite, and tris(2-chloroethyl) phosphite, and tris(2,3-dichloropropyl)phosphite; tricycloalkyl phosphates such as tricyclohexyl phosphite; triaryl phosphites such as triphenyl phosphite, tricresyl phosphite, tris(ethylphenyl) phosphite, tris(2,4-di-t-butylphenyl) phosphite, tris(nonylphenyl) phosphite, and tris(hydroxyphenyl) phosphite; and arylalkyl phosphites such as phenyldidecyl phosphite, diphenyldecyl phosphite, diphenylisooctyl phosphite, phenylisooctyl phosphite, and 2-ethylhexyldiphenyl phosphite Examples of phosphite esters include distearylpentaerythrithyl diphosphite and bis(2,4-t-butylphenyl) pentaerythrithyl diphosphite. These may be used in combinations of two or more.

Trimethyl phosphate and phosphite esters of the aforementioned general formula are preferred, while aromatic phosphite esters more preferable, and tris(2,4-di-t-butylphenyl)phosphite is even more preferable.

This component (f) should be added in an amount of 10 to 1000 ppm, and preferably 30 to 300 ppm, relative to the polycarbonate.

Additives (g) (referred to below as other additives (g)) other than (b) through (f) above may also be added to the polycarbonate resin composition in the present invention, provided that the object of the present invention is not thereby compromised. Specific examples of such other additives (g) include a broad range of additives generally added to polycarbonates depending on the intended purpose, such as heat resistance stabilizers, epoxy compounds, UV absorbents, release agents, colorants, antistatic agents, slip agents, antiblocking agents, lubricants, antifogging agents, natural oils, synthetic oils, waxes, organic fillers, and inorganic fillers.

The above agents (b) through (g) should be added and kneaded while the polycarbonate is molten.

The polycarbonates for optical use in the present invention are particularly suitable materials for forming optical disks.

Optical Disk Substrate

The optical disk of the present invention is obtained by molding the aforementioned polycarbonates for optical use. Examples of molding methods include, but are not particularly limited to, common injection molding, and injection compression methods, in particular.

Injection compression comprises a clamping step in which a thin, nickel disk referred to as a stamper, which has data inscribed on the surface for transfer to an optical disk substrate, is clamped to one side of an injection molding mold; an injection step for the injection of polycarbonate resin having the prescribed properties; a pressure holding step in which an injection cylinder is operated for a certain period of time after injection to maintain the pressure; a cooling step in which the operation of the injection cylinder is stopped, and the material is cooled without reducing the clamping pressure; and a mold opening step in which the operation of the clamping cylinder is stopped, and the mold is opened, giving an injection molded article in the form of an optical disk substrate with the stamper data transferred thereon.

The polycarbonate for optical use in the present invention can be used to obtain an optical disk substrate with good transfer properties to the outermost circumference of the substrate by setting the mold temperature to between 50 and 130° C. on the side where the stamper is mounted, and by maintaining a certain level of pressure in the cooling step after the completion of the injection step and pressure holding step. The use of the polycarbonates for optical use in the present invention will result in exceptional transfer properties even when molded at lower temperatures.

The optical disk substrate is taken out of the mold after the injection molding described above, a recording layer or reflecting layer is formed on the surface, a protective film is formed on top of that, and a plurality of substrates can be laminated as needed, giving an optical disk. A recording layer can be formed using any metal materials such as tellurium materials or thallium materials, or organic materials such as cyanin dyes, phthalocyanin dyes, or azo dyes. A reflecting layer can be formed through the deposition of a thin film such as of aluminum, silver, or gold, and a protecting layer can be formed by applying a common material and curing it to solidification.

Examples of optical disk substrates in the present invention include substrates for CD, LD, CD-R, optomagnetic disks, phase change disks, DVD-ROM, DVD-R, DVD-RAM, and DVD-RW.

The polycarbonates for optical use in the present invention are particularly useful for high recording density substrates with a groove depth of 50 nm or more and a groove pitch of 0.85 $\mu$m or less, which can be particularly useful for forming DVD-R, DVD-RAM, and DVD-RW. The substrate is usually 0.6 mm thick.

Effect of the Invention

The present invention provides polycarbonates for optical use which are suitable as materials for forming optical materials, especially materials for forming optical disks, with better color stability and formability.

The polycarbonates for optical use in the present invention have a specific viscosity average molecular weight and have a low glass transition temperature, resulting in better formability and color stability, as well as more precise and uniform transfer of fine pits and grooves on the surface during the injection molding of optical disk substrates.

EXAMPLES

The present invention is illustrated in further detail in the following examples, but the invention is not limited to these examples.

Examples 1 and 2, and Comparative Example 1

Melt Polycondensation of Polycarbonates 0.44 kmol bisphenol A (by Nippon G E Plastics KK: 0.1 ppm chlorine or less, 0.1 ppm iron or less, 0.1 ppm sodium or less, and 0.1 ppm sulfur or less) and 0.449 kmol diphenyl carbonate (by Eny Co.: 0.1 ppm chlorine or less, 0.1 ppm iron or less, 0.1 ppm sodium or less, and 0.1 ppm sulfur or less), each of which had been filtered with a 0.2 $\mu$m filter, were introduced into a first (250 L) stirred tank and dissolved at 140° C. As the bisphenol A and diphenyl carbonate were fed at a rate of 0.16 kmol and 0.163 kmol per hour, respectively, while keeping the contents of the first stirred tank at a certain level, the mixture was transferred at a rate of 0.16 kmol per hour, as calculated in terms of the bisphenol A, to a second (50 L) stirred tank.

The temperature of the second stirred tank was kept at 180° C. The catalyst added to the second stirred tank consisted of tetramethyl ammonium hydroxide (0.04 mol per hour) and sodium hydroxide (0.00016 mol per hour) ($1\times10^{-6}$ mol/mol-bisphenol A), and the contents were stirred, with a residence time of 30 minutes, to bring about polycarbonate melt polycondensation.

The reaction solution was transferred at a rate of 0.16 kmol per hour, as calculated in terms of bisphenol A, to a third (50 L) stirred tank with a temperature of 210° C. and a pressure of 200 mmHg. The residence time was set to 30 minutes in the third stirred tank, and the contents were stirred as the phenol was distilled off.

The reaction solution was transferred at a rate of 0.16 kmol per hour, as calculated in terms of bisphenol A, to a fourth (50 L) stirred tank with a temperature of 240° C. and a pressure of 15 mmHg. The residence time was set to 30 minutes in the third stirred tank, and the contents were stirred as the phenol was distilled off. The reaction product (polycarbonate) obtained upon steady state had an intrinsic viscosity {I} of 0.15 dL/g.

The reaction product was then pressurized using a gear pump and pumped to a centrifugal thin film deposition device at a rate of 0.16 kmol per hour, as calculated in terms of the bisphenol A, and the reaction was allowed to progress. The thin film deposition device was set to a temperature of 270° C. and a pressure of 2 mmHg.

The reaction product from the reaction in the thin film deposition device was pumped by a pump gear from the bottom of the deposition device at a rate of 0.16 kmol per hour (about 40 kg/hour), as calculated in terms of the bisphenol A, to a twin-screw horizontal stirred polymerization tank set to a temperature of 270° C. and a pressure of 0.2 mmHg (L/D=3, stirring blade rotating diameter 220 mm, interior capacity of 80 L), and polymerization was brought about at a residence time of 30 minutes. The polymer intrinsic viscosity (IV) was 0.353 dL/g (Example 1). The above was repeated with a temperature of 280° C. in the final stage, resulting in an intrinsic viscosity of 0.373 dL/g (Example 2) and 0.383 dL/g (Comparative Example 1).

Additives Used

While still molten, the resulting polycarbonate was pumped by a gear pump to a twin-screw extruder. At the same time, 400 ppm glycerin monostearate (GMS) was added to the polycarbonate, and the mixture was melt kneaded and extruded from the extruder, giving pellets of polycarbonate for optical use.

Table 1 shows the glass transition temperatures of the resulting polycarbonates for optical use. The glass transition temperatures were evaluated on the basis of peaks in the DDSC curve obtained in the second round of heating, where the material was heated at a rate of 20° C./min from ambient temperature to 280° C. in a nitrogen current.

Transfer Properties

The resulting polycarbonate pellets were used to produce a CD-R (120 mm diameter), and the transfer properties were evaluated. A disc molding machine (SD-30, by Sumitomo Heavy Industries) was used with a CD-R stamper having a pit depth set to 1700 Å. The mold temperature was 118° C.

The groove depth of the resulting substrates was measured with an AFM at radial positions 24 mm, 34 mm, 45 mm, 55 mm, and 57 mm from the center.

The results are given in Table 1.

Comparative Example 2

Phosgene was introduced as methylene chloride and a potassium hydroxide aqueous solution of bisphenol A were stirred at 20° C., and a reaction was brought about with the addition of p-tert-butylphenol and triethylamine.

The methylene chloride solvent was separated from the reaction mixture, which was washed with water and added in the form of drops into hot water, and the polycarbonate was extracted.

The resulting polycarbonate had an intrinsic viscosity of 0.353 dL/g.

400 ppm glycerin monostearate (GMS) relative to the carbonate was added to the resulting polycarbonate, and the mixture was extruded at 280 to 300° C. and pelleted to give a molding material.

The resulting polycarbonate was used to from CD-R in the same manner as in Example 1 and was similarly evaluated.

The results are given in Table 1.

TABLE 1

|  |  | Example 1 | Example 2 | Comparative Example 1 | Comparative Example 2 |
|---|---|---|---|---|---|
| Polycarbonate | Intrinsic viscosity | 0.353 | 0.373 | 0.383 | 0.353 |
|  | Glass transition temperature (° C.) | 145.3 | 146.3 | 147.9 | 147.6 |
| Transfer properties | R24 | 1674 | 1685 | 1635 | 1638 |
|  | R34 | 1667 | 1677 | 1657 | 1629 |
|  | R45 | 1662 | 1659 | 1619 | 1600 |
|  | R55 | 1626 | 1599 | 1499 | 1491 |
|  | R57 | 1593 | 1505 | 1405 | 1344 |
|  | Difference from interior toward outside | 81 | 180 | 252 | 294 |

Because the data was properly recorded, grooves were formed across the entire perimeter of the CD-R substrates that had been formed, but the polycarbonates used in the examples of the invention had better transfer properties, resulting in more uniform formation of grooves over the entire surface, less difference from the interior toward the outside, and better transfer at lower temperatures.

The polycarbonates for optical use in the examples of the invention were thus more suitable for optical disks.

What is claimed is:

1. Polycarbonates for optical use, prepared by melt polycondensing a bisphenol and carbonic diester in the presence of an alkaline compound catalyst, wherein said polycarbonates have:

(i) an intrinsic viscosity (IV) as determined at 20° C. in methylene chloride of between 0.34 and 0.38;

(ii) a glass transition temperature (Tg) as determined by DSC of between 143 and 147° C.; and (iii) an intrinsic viscosity (IV) and glass transition temperature (Tg) ratio complying with the following formula (A):

$$IV \times 95.888 + 107.9 < Tg < IV \times 95.888 + 113.7 \quad (A).$$

2. Polycarbonates for optical use according to claim 1, wherein the bisphenol substantially comprises bisphenol A.

3. Polycarbonates for optical use according to claim 1 which comprise no more than 1.5 wt % fractions with a molecular weight of 1,000 or less, as determined by GPC.

4. An optical disk substrate formed of a polycarbonate for optical use according to claim 1.

5. An optical disk substrate formed of a polycarbonate for optical use according to claim 3.

6. Polycarbonates for optical use, prepared by melt polycondensing a bisphenol and carbonic diester in the presence of an alkaline compound catalyst, wherein said polycarbonates have:

(i) an intrinsic viscosity (IV) as determined at 20° C. in methylene chloride of between 0.34 and 0.38;

(ii) a glass transition temperature (Tg) as determined by DSC of between 143 and 147° C.; and (iii) an intrinsic viscosity (IV) and glass transition temperature (Tg) ratio complying with the following formula (A):

$$IV \times 95.888 + 109.3 < Tg < 95.888 + 112.3 \quad (A).$$

7. Polycarbonates for optical use according to claim 6, wherein the bisphenol substantially comprises bisphenol A.

8. Polycarbonates for optical use according to claim 1 which comprise no more than 1.5 wt % fractions with a molecular weight of 1,000 or less, as determined by GPC.

9. An optical disk substrate formed of a polycarbonate for optical use according to claim 6.

10. An optical disk substrate formed of a polycarbonate for optical use according to claim 6.

* * * * *